(12) United States Patent
Wang et al.

(10) Patent No.: US 10,984,289 B2
(45) Date of Patent: Apr. 20, 2021

(54) LICENSE PLATE RECOGNITION METHOD, DEVICE THEREOF, AND USER EQUIPMENT

(71) Applicant: SHENZHEN INSTITUTE OF ADVANCED TECHNOLOGY, Shenzhen (CN)

(72) Inventors: Shuqiang Wang, Shenzhen (CN); Dewei Zeng, Shenzhen (CN); Yanyan Shen, Shenzhen (CN)

(73) Assignee: SHENZHEN INSTITUTE OF ADVANCED TECHNOLOGY, Shenzhen (CN)

( * ) Notice: Subject to any disclaimer, the term of this patent is extended or adjusted under 35 U.S.C. 154(b) by 108 days.

(21) Appl. No.: 16/472,198

(22) PCT Filed: Dec. 23, 2016

(86) PCT No.: PCT/CN2016/111756
§ 371 (c)(1),
(2) Date: Jun. 21, 2019

(87) PCT Pub. No.: WO2018/112900
PCT Pub. Date: Jun. 28, 2018

(65) Prior Publication Data
US 2020/0193232 A1 Jun. 18, 2020

(51) Int. Cl.
*G06K 9/62* (2006.01)
*G06K 9/00* (2006.01)
(Continued)

(52) U.S. Cl.
CPC ....... *G06K 9/6257* (2013.01); *G06K 9/00664* (2013.01); *G06K 9/2054* (2013.01);
(Continued)

(58) Field of Classification Search
CPC . G06N 3/0454; G06K 9/00664; G06K 9/2054
See application file for complete search history.

(56) References Cited

U.S. PATENT DOCUMENTS

| 2010/0054539 A1* | 3/2010 | Challa | G06K 9/6293 382/105 |
| 2012/0148105 A1* | 6/2012 | Burry | G08G 1/0175 382/105 |

(Continued)

FOREIGN PATENT DOCUMENTS

| CN | 104298976 A | 1/2015 |
| CN | 104809443 A | 7/2015 |

(Continued)

OTHER PUBLICATIONS

International Search Report issued corresponding International application No. PCT/CN2016/111756, dated Feb. 7, 2018.

*Primary Examiner* — Santiago Garcia

(57) ABSTRACT

The present disclosure provides a license plate recognition method, a device thereof, and a user equipment. In the method, a vehicle image is acquired and input to a vehicle searching convolutional neural network (CNN) to search whether there is a vehicle. Then, a license plate image is acquired and input to a license plate searching CNN to search whether there is a license plate. And the license plate image is input to a tensor neural network to detect abnormal or not. Then, a recognition image is acquired and input to judge an area number, letters, and numbers. And an area number image, a letter image, and a number image are output and input to their corresponding recognition CNNs respectively to recognize an area number, letters, and numbers and output respectively. Ultimately, a license plate number recognition result in a form of "area number letter number" are output.

10 Claims, 6 Drawing Sheets

(51) Int. Cl.
  *G06K 9/20*  (2006.01)
  *G06N 3/04*  (2006.01)
  *G06N 3/08*  (2006.01)
(52) U.S. Cl.
  CPC ......... *G06K 9/6232* (2013.01); *G06K 9/6265* (2013.01); *G06N 3/0454* (2013.01); *G06N 3/08* (2013.01); *G06K 2209/15* (2013.01)

(56) References Cited

U.S. PATENT DOCUMENTS

| | | | |
|---|---|---|---|
| 2013/0066542 A1* | 3/2013 | Chung | G08G 1/054 701/119 |
| 2013/0129151 A1 | 5/2013 | Rodriguez Serrano et al. | |
| 2013/0182910 A1* | 7/2013 | Burry | G06K 9/6279 382/105 |
| 2014/0219563 A1* | 8/2014 | Rodriguez-Serrano | G06K 9/18 382/182 |
| 2014/0369566 A1* | 12/2014 | Chigos | G06K 9/325 382/105 |
| 2014/0369567 A1* | 12/2014 | Chigos | G06K 9/3258 382/105 |
| 2015/0054639 A1* | 2/2015 | Rosen | H04M 3/2281 340/439 |
| 2015/0312400 A1* | 10/2015 | Hansen | H04M 1/72547 455/414.1 |
| 2016/0210532 A1* | 7/2016 | Soldevila | G06K 9/3258 |
| 2016/0253883 A1* | 9/2016 | Westmacott | H04N 7/181 348/159 |
| 2016/0307061 A1* | 10/2016 | Bulan | G06K 9/6256 |
| 2017/0177965 A1* | 6/2017 | Gordo Soldevila | G06K 9/4628 |
| 2017/0300786 A1* | 10/2017 | Gope | G06T 5/20 |
| 2018/0082304 A1* | 3/2018 | Summerlin | G06Q 20/4016 |
| 2020/0293794 A1* | 9/2020 | Popov | G06K 9/6269 |

FOREIGN PATENT DOCUMENTS

| | | |
|---|---|---|
| CN | 105354572 A | 2/2016 |
| CN | 105354574 A | 2/2016 |
| CN | 1o6096602 A | 11/2016 |

\* cited by examiner

LICENSE PLATE RECOGNITION METHOD, DEVICE THEREOF, AND USER EQUIPMENT

TECHNICAL FIELD

The present disclosure relates to a field of image processing and artificial intelligence technology, and in particular to a license plate recognition method, a device thereof and a user equipment.

BACKGROUND

A convolutional neural network (CNN) is a feedforward neural network. Artificial neurons of the CNN may respond to surrounding units within a portion of the coverage area, and have excellent large image processing performance. The CNN avoids complex pre-treatments to images, and original images are able to be input directly A basic structure of the CNN comprises two layers: a convolutional layer and a pooling layer. The convolutional layer nonlinearly convolves an output of a previous layer through a plurality of trainable filter banks to generate a feature map. The pooling layer performs pooling operations on four pixels of each group in the feature map to aggregate space or feature types, and is able to identify features with displacement, scaling, and other forms of distortion invariance.

The CNN with better image recognition effect has larger size of adjustable parameters, higher memory complexity and computational complexity, which is not conducive of applying the network to mobile devices or embedded devices. In addition, acceleration methods such as distributed parallel computing are not practical for mobile devices or embedded devices. The CNN has been widely used in a field of license plate recognition, but how to identify license plates and to enable the system to have accurate classification results while the size of the network is moderate and can be embedded in mobile devices such as mobile phones is still a problem needed to be solved.

SUMMARY

The present disclosure provides a license plate recognition method, a license plate recognition method device, and a user equipment, which has accurate classification, has a medium size in network, and is able to be embedded in a mobile device.

One embodiment of the present disclosure provides a license plate recognition method. The license plate recognition method includes steps:

acquiring a vehicle image and inputting the vehicle image to a vehicle searching CNN (convolutional neural network) to search whether there is a vehicle corresponding to the vehicle image;

acquiring a license plate image on the vehicle image, and inputting the license plate image to a license plate searching CNN to search whether there is a license plate corresponding to the license plate image, if there is the vehicle image of the vehicle;

inputting the license plate image to a tensor neural network to detect the license plate image is abnormal or not, if there is a license plate corresponding to the license plate image;

acquiring a recognition image of the license plate image, and inputting the recognition image to a determining neural network to judge an area number, letters, and numbers in the recognition image, and outputting an area number image corresponding to the area number, a letter image corresponding to the letters, and a number image corresponding to the number, if the license plate image is normal;

inputting the area number image, the letter image, the number image to an area number recognition CNN, a letter recognition CNN, a number recognition CNN respectively to recognize an area number, letters, and numbers and outputting the area number, letters, and numbers respectively; and outputting a license plate number recognition result in a form of "area number letter number" according to the area number, letters, and numbers output.

Optionally, the step of acquiring the vehicle image and inputting the vehicle image to the vehicle searching CNN to search whether there is the vehicle corresponding to the vehicle image includes steps:

acquiring the vehicle image in a video stream data, the vehicle image being represented in a tensor mode;

obtaining a first feature map according to multiple geometric space transformation correction, convolution processing, and pooling processing in the vehicle image by a space transformation network and the CNN;

outputting a column vector by vectoring the first feature map and connecting a plurality of fully connected layers to obtain a weight matrix of the fully connected layers;

performing a tensor column decomposition on the weight matrix of the fully connected layer to extract a first feature vector; and inputting the first feature vector to an output layer of the CNN to classify and predict, and optimizing adjustable parameters to search whether there is a vehicle corresponding to the vehicle image.

Optionally, the step of inputting the license plate image to the license plate searching CNN to search whether there is a license plate corresponding to the license plate image includes steps:

obtaining a second feature map according to multiple geometric space transformation correction, convolution processing, and pooling processing on the license plate image by the space transformation network and the CNN;

outputting the column vector by vectoring the second feature map and connecting a plurality of fully connected layers to obtain the weight matrix of the fully connected layers;

performing the tensor column decomposition on the weight matrix of the fully connected layer to extract a second feature vector; and inputting the second feature vector to the output layer of the CNN to classify and predict, and optimizing the adjustable parameters to search whether there is a license plate corresponding to the license plate image.

Optionally the step of optimizing the adjustable parameters is to optimize all the adjustable parameters in the network according to a back-propagation (BP) algorithm, that is, an update of a space transformation matrix, a weight and an offset is according to a local gradient calculation of an error returned from a latter layer.

Optionally, the step of inputting the license plate image to the tensor neural network to detect the license plate image is abnormal or not includes:

inputting the license plate image to the trained tensor neural network directly to obtain a corresponding direct probability density ratio; and comparing the direct probability density ratio with a critical direct probability density ratio obtained after completing a training of the tensor neural network; if the direct probability density ratio is greater than the critical directly probability density ratio, the license plate image is normal, if not, the license plate image is abnormal.

A second embodiment of the present disclosure provides a license plate recognition device. The device includes:

a data acquisition module configured to acquire a vehicle image in a vehicle video stream image, acquire a license plate image in the vehicle image, and acquire a recognition image in the license plate image;

a vehicle search module configured to input the vehicle image to a vehicle searching CNN to search whether there is a vehicle corresponding to the vehicle image;

a license plate search module configured to input the license plate image to the license plate searching CNN to search whether there is a license plate corresponding to the license plate image;

an anomaly detection module configured to input the license plate image to a tensor neural network to detect the license plate image is abnormal or not; and a license plate recognition module configured to input the recognition image to a determining neural network to judge an area number, letters, and numbers in the recognition image, and output an area number image corresponding to the area number, a letter image corresponding to the letters, and a number image corresponding to the numbers, and then input the area number image, the letter image, the number image to an area number recognition CNN, a letter recognition CNN, a number recognition CNN respectively to recognize an area number, letters, and numbers and outputting the area number, letters, and numbers respectively; and output a license plate number recognition result in a form of "area number letter number" according to the area number, letters, and numbers output.

Optionally, the vehicle search module includes:

a vehicle image processing unit configured to obtain a first feature map according to multiple geometric space transformation correction, convolution processing, and pooling processing in the vehicle image by a space transformation network and the CNN;

a weight matrix acquisition unit configured to output a column vector by vectoring the first feature map and connecting a plurality of fully connected layers to obtain a weight matrix of the fully connected layers;

a tensor decomposition unit configured to perform a tensor column decomposition on the weight matrix of the fully connected layer to extract a first feature vector; and a classification prediction unit configured to input the first feature vector to an output layer of the CNN to classify and predict, and optimizing adjustable parameters to search whether there is a vehicle corresponding to the vehicle image.

Optionally, the license plate search module includes:

a license plate image processing unit configured to obtain a second feature map according to multiple geometric space transformation correction, convolution processing, and pooling processing oil the license plate image by the space transformation network and the CNN;

the weight matrix acquisition unit configured to output the column vector by vectoring the second feature map and connecting a plurality of fully connected layers to obtain the weight matrix of the fully connected layers;

the tensor decomposition unit configured to perform the tensor column decomposition on the weight matrix of the fully connected layer to extract a second feature vector; and the classification prediction unit configured to input the second feature vector to the output layer of the CNN to classify and predict, and optimizing the adjustable parameters to search whether there is a license plate corresponding to the license plate image.

Optionally, the anomaly detection module includes:

a tensor neural network unit configured to obtain a corresponding direct probability density ratio according to the license plate image input; and a comparison unit configured to compare the direct probability density ratio with a critical direct probability density ratio obtained after completing a training of the tensor neural network; if the direct probability density ratio is greater than the critical directly probability density ratio, the license plate image is normal, if not, the license plate image is abnormal.

A third embodiment provides a user equipment including a license plate recognition device of the second embodiment.

Comparing with the prior art, in the present disclosure, the vehicle image is acquired. And the vehicle image is input to the vehicle searching CNN to search whether there is the vehicle corresponding to the vehicle image. If there is the vehicle image of the vehicle, the license plate image in the vehicle image is acquired, and the license plate image is input to the license plate searching CNN to search whether there is the license plate corresponding to the license plate image. And then, the license plate image is input to the tensor neural network to detect the license plate image is abnormal or not. If the license plate image is normal, the recognition image of the license plate image is acquired. Then the recognition image is input to the determining neural network to judge an area number, letters, and numbers in the recognition image. And the area number image corresponding to the area number, the letter image corresponding to the letters, and the number image corresponding to the number are output. And then the area number image, the letter image, the number image are input to the area number recognition CNN, the letter recognition CNN, the number recognition CNN respectively to recognize the area number, letters and numbers, and the area number, letters and numbers are output respectively. Ultimately, the license plate number recognition result in the form of "area number letter number" according to the area number, letters, and numbers output are output. It can be seen that the license plate recognition method provided by the embodiment of the present disclosure has an accurate classification while the network is moderate in size and is able to be embedded in a mobile device.

BRIEF DESCRIPTION OF DRAWINGS

The drawings are included to provide a further understanding of embodiments of the present disclosure. The drawings to be used in the embodiments will be briefly described below. Apparently, the drawings in the following description are merely some of the embodiments of the present disclosure, and those skilled in the art are able to obtain other drawings according to the drawings without contributing any inventive labor. In the drawing.

DETAILED DESCRIPTION

The technical solutions in the embodiments of the present disclosure are clearly and completely described in the following with reference to the accompanying drawings in the embodiments of the present disclosure. Apparently, the described embodiments are only a pail of the embodiments of the present disclosure, and not all of the embodiments. All other embodiments obtained by a person of ordinary skill in the art based on the embodiments of the present disclosure without creative efforts are within the scope of the present disclosure.

It should be noted that the terms "comprising" and "including", and any variations thereof are intended to cover a non-exclusive inclusion, for example, a process, method, system, product or process comprising a series of steps or units. The apparatus is not necessarily limited to those steps or units that are clearly listed, but may include oilier steps or units that are not explicitly listed or inherent to such procedures, methods, products, or devices.

The embodiments of the present disclosure disclose a license plate recognition method, a license plate recognition device, and a user equipment, which realize an accurate classification, has a medium size in network, and is able to be embedded in a mobile device. Details are described below in conjunction with the drawings.

Embodiment 1

Figure 1:
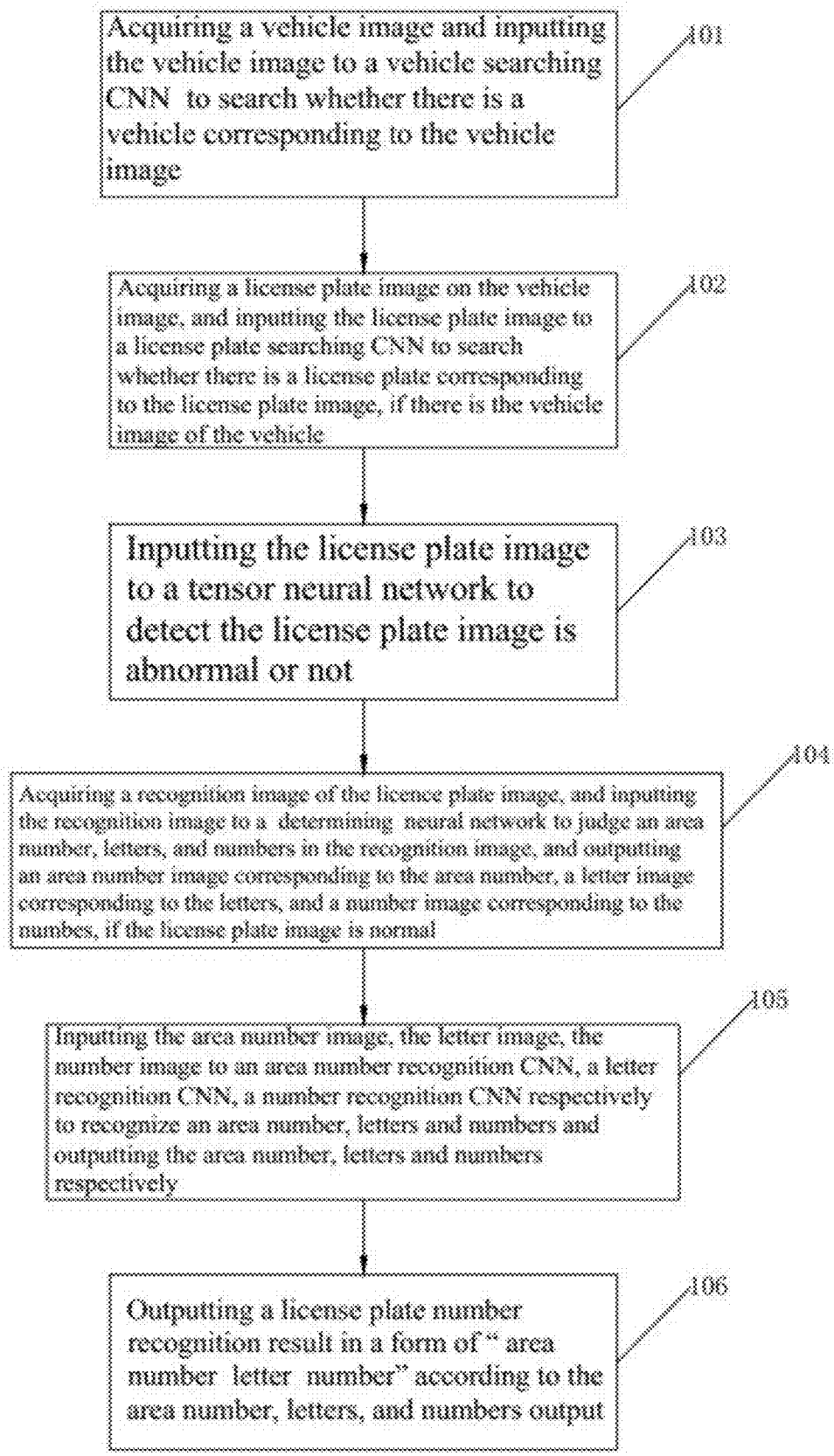
FIG. 1 is a schematic flow chart of a license plate recognition method according to one embodiment of the present disclosure.

FIG. 1 is a schematic flow chart of a license plate recognition method according to one embodiment of the present disclosure. As shown in FIG. 1, the license plate recognition method includes steps:

101. acquiring a vehicle image and inputting the vehicle image to a vehicle searching convolutional neural network (CNN) to search whether there is a vehicle corresponding to the vehicle image:

A mobile device or an embedded device such as an electronic camera collects color video stream data, and the data is stored in a tensor mode. First, acquiring a vehicle image by traversing from an upper left comer to a lower right corner of a video stream image in a specific step length from the video stream data. The vehicle image is preprocessed to obtain a preprocessed vehicle image. The preprocessed vehicle image is input to the vehicle searching CNN to search whether there is a vehicle corresponding to the vehicle image. To be specific, first, multiple geometric space transformation correction, convolution processing, and pooling processing are applied on the vehicle image by a space transformation network and the CNN. That is, the vehicle image is firstly processes by geometric space transformation correction, then processed by convolution processing, then processed by pooling processing, and then processed by the geometric space transformation correction again, and loop over and over for multiple times. And a first feature map is obtained. Then, a column vector is output by vectoring the first feature map and a plurality of fully connected layers are connected to obtain a weight matrix of the fully connected layers. Further, a tensor column decomposition is performed on the weight matrix of the fully connected layer to extract a first feature vector. Finally, the first feature vector is input to an output layer of the CNN to classify and predict, and optimizing adjustable parameters to search whether there is a vehicle corresponding to the vehicle image. The step of optimizing the adjustable parameters is to optimize all the adjustable parameters in the network according to a BP (back-propagation) algorithm. That is an update of a space transformation matrix, a weight in the net work and an offset is according to a local gradient calculation of an error returned from a latter layer.

102. acquiring a license plate image on the vehicle image, and inputting the license plate image to a license plate searching CNN to search whether there is a license plate corresponding to the license plate image, if there is the vehicle image of the vehicle;

If there is the vehicle image of the vehicle after searching from the vehicle searching CNN, the license plate image in the vehicle image is collected. To be specific, a license plate image is acquired by traversing from an upper left comer to a lower right comer of the vehicle image in a specific step length. The license plate image is preprocessed to obtain a preprocessed license plate image. The preprocessed license plate image is input to the license plate searching CNN to search whether there is a license plate corresponding to the license plate image. To be specific, first, multiple geometric space transformation correction, convolution processing, and pooling processing are applied on the license plate image by the space transformation network and the CNN. That is, the license plate image is firstly processes by geometric space transformation correction, then processed by convolution processing, then processed by pooling processing, and then processed by the geometric space transformation correction again, and loop over and over for multiple times. And a second feature map is obtained. Then, the column vector is output by vectoring the second feature map and a plurality of fully connected layers are connected to obtain the weight matrix of the fully connected layers. Further, the tensor column decomposition is performed on the weight matrix of the fully connected layer to extract a second feature vector. Finally, the second feature vector is input to an output layer of the CNN to classify and predict, and optimizing adjustable parameters to search whether there is a license plate corresponding to the license plate image. The step of optimizing the adjustable parameters is to optimize all the adjustable parameters in the network according to the back-propagation (BP) algorithm. That is, the update of the space transformation matrix, the weight and the offset is according to the local gradient calculation of the error returned from the latter layer.

103. inputting the license plate image to a tensor neural network to detect the license plate image is abnormal or not;

If there is the license plate corresponding to the license plate image after searching from the license plate searching CNN, the license plate image is input to a tensor neural network to detect the license plate image is abnormal or not. To be specific, the license plate image is input to the trained tensor neural network directly to obtain a corresponding direct probability density ratio. And then the direct probability density ratio is compared with a critical direct probability density ratio obtained after completing a training of the tensor neural network. If the direct probability density ratio is greater than the critical directly probability density ratio, the license plate image is normal. If not, the license plate image is abnormal.

104. acquiring a recognition image of the license plate image, and inputting the recognition image to a determining neural network to judge an area number, letters, and numbers in the recognition image, and outputting an area number image corresponding to the area number, a letter image corresponding to the letters, and a number image corresponding to the number, if the license plate image is normal;

If the license plate image is normal, the recognition image of the license plate image is acquired. To be specific, the recognition image is acquired by traversing from an upper left corner to a lower right corner of the license plate image in the specific step length. Then the recognition image is input to a determining neural network to judge the area number, letters and numbers in the recognition image. And the area number image corresponding to the area number, the letter image corresponding to the letters, and the number image corresponding to the number are output. To be specific, the recognition image is preprocessed to obtain a preprocessed recognition image. The preprocessed recognition image is judged by the simple determining neural network. The output of the determining neural network includes four category: the area number, letters, numbers, and others. If a judge result is others, the current recognition image is discarded, and the next recognition image is judged. If the judgment result is the area number, the recognition image enters the license plate recognition stage to recognize the area number. If the judgment result is letters, the recognition image enters the license plate recognition stage to recognize the letters. If the judgment result is numbers, the recognition image enters the license plate recognition stage to recognize the numbers.

105. inputting the area number image, the letter image, the number image to an area number recognition CNN, a letter recognition CNN, a number recognition CNN respectively to recognize an area number, letters and numbers, and outputting the area number, letters, and numbers respectively;

The license plate recognition stage is consist of three concurrent CNNs, of which are the area number recognition CNN, the letter recognition CNN, and the number recognition CNN The area number recognition is to preprocess the area number image to obtain a preprocessed area number image. And the preprocessed area number image enters the area number recognition CNN to recognize the area number.

The letter recognition is to preprocess the letter image to obtain a preprocessed letter image. And the preprocessed letter image enters the letter recognition CNN to recognize the letters.

The number recognition is to preprocess the number image to obtain a preprocessed number image. And the preprocessed number image enters the number recognition CNN to recognize the numbers.

106. outputting a license plate number recognition result in a form of "area number letter number" according to the area number, letters, and numbers output;

The license plate number recognition result in a form of "area number letter number" is output according to the three CNNs ultimately.

It should be noted that, in the embodiment, the preprocessing of various types of images is selected from a smooth processing, a denoising processing, an illumination normalization processing, an enhancement processing, and so on. And different preprocessing are selected according to specific needs, where no limitation is made herein.

The method as shown in FIG. 1, in the embodiment, the vehicle image is acquired. And the vehicle image is input to the vehicle searching CNN to search whether there is the vehicle corresponding to the vehicle image. If there is the vehicle image of the vehicle, the license plate image in the vehicle image is acquired, and the license plate image is input to the license plate searching CNN to search whether there is the license plate corresponding to the license plate image. And then, the license plate image is input to the tensor neural network to detect the license plate image is abnormal or not. If the license plate image is normal, the recognition image of the license plate image is acquired. Then the recognition image is input to the determining neural network to judge an area number, letters, and numbers in the recognition image. And the area number image corresponding to the area number, the letter image corresponding to the letters, and the number image corresponding to the number are output. And then the area number image, the letter image, the number image are input to the area number recognition CNN, the letter recognition CNN, the number recognition CNN respectively to recognize the area number, letters and numbers and the area number, letters and numbers are output respectively. Ultimately, the license plate number recognition result in the form of "area number letter number" according to the area number, letters, and numbers output are output. It can be seen that the license plate recognition method provided by the embodiment of the present disclosure introduces the space transformation network and tensor decomposition in the CNN, improves the CNN on classification accuracy and network size, and recognizes the license plate by multi-stage identification of multiple CNNs, which has the accurate classification while the network is moderate in size and is able to be embedded in the mobile device.

Embodiment 2

Figure 2:
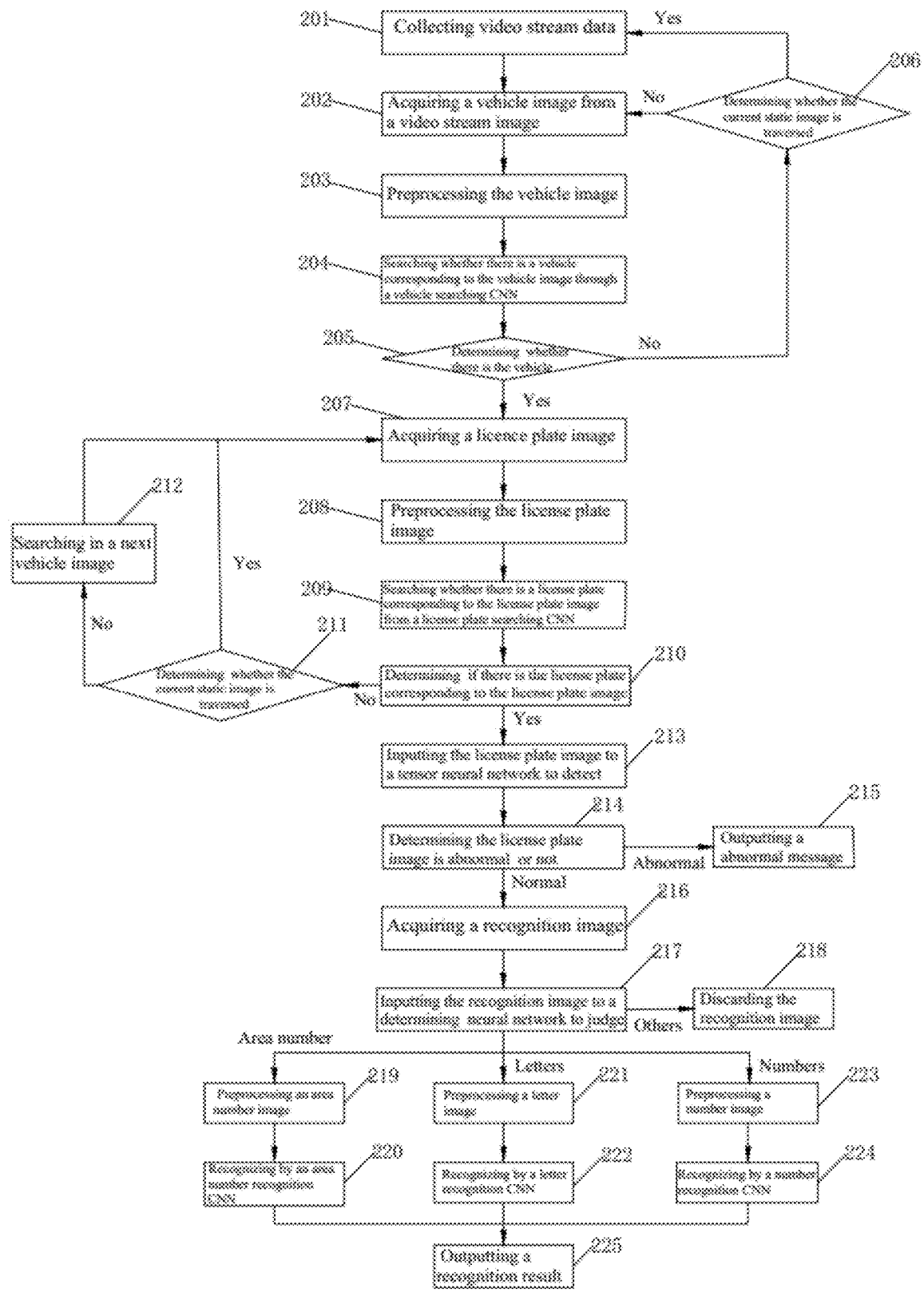
FIG. 2 is a schematic flow chart of another license plate recognition method according to one embodiment of the present disclosure.

As shown in FIG. 2, FIG. 2 is a schematic flow chart of another license plate recognition method. The license plate recognition method includes steps:

201. collecting video stream data;

A mobile device or an embedded device such as an electronic camera collects color video stream data, and the data is stored in a tensor mode.

202. acquiring a vehicle image from a video stream image;

The vehicle image is acquired by traversing from an upper left corner to a lower right corner of the video stream image in a specific step length from the video stream data.

203. preprocessing the vehicle image;

The vehicle image is preprocessed to obtain a preprocessed vehicle image. The preprocessing of the vehicle image is selected from a smooth processing, a denoising processing, an illumination normalization processing, an enhancement processing, and so on. And the preprocessing of any combination is performed according to specific needs, and is not limited herein.

204. searching whether there is a vehicle corresponding to the vehicle image through a vehicle searching CNN;

The preprocessed vehicle image is input to the vehicle searching CNN to search whether there is a vehicle corresponding to the vehicle image. The CNN in the embodiment is a CNN that introduces a space transformation network and a tensor decomposition, of which improves the conventional CNN in a perspective of classification accuracy and network size. To be specific, first, multiple geometric space transformation correction, convolution processing, and pooling processing are applied on the vehicle image by a space transformation network and the CNN. That is, the vehicle image is firstly processes by geometric space transformation correction, then processed by convolution processing, then processed by pooling processing, and then processed by the geometric space transformation correction again, and loop over and over for multiple times. And a first feature map is obtained. Then, a column vector is output by vectoring the first feature map and a plurality of fully connected layers are connected to obtain a weight matrix of the frilly connected layers. Further, a tensor column decomposition is performed on the weight matrix of the fully connected layer to extract a first feature vector. Finally, the first feature vector is input to an output layer of the CNN to classify and predict, and optimizing adjustable parameters to search whether there is a vehicle corresponding to the vehicle image. The step of optimizing the adjustable parameters is to optimize all the adjustable parameters in the network according to a BP (back-propagation) algorithm. That is, an update of a space transformation matrix, a weight and an offset is according to a local gradient calculation of an error returned from a latter layer.

Figure 3:
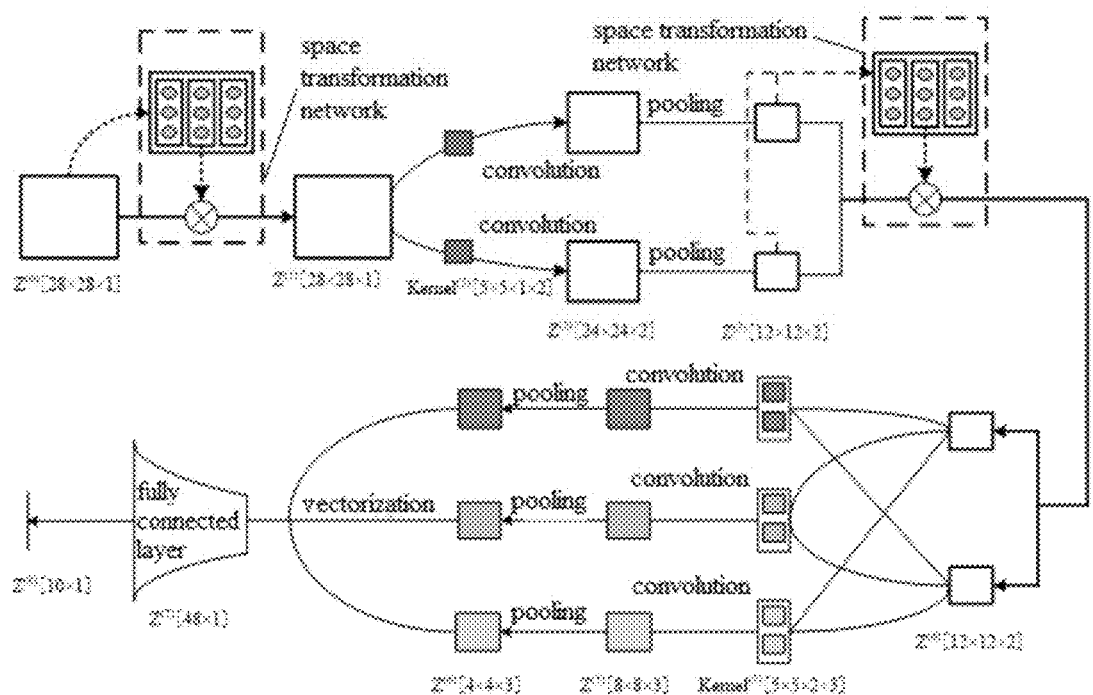
FIG. 3 is a schematic diagram showing an improvement of a conventional convolutional neural network in one embodiment of the present disclosure.

The vehicle image is represented in the tensor mode and is input to an input module of the CNN directly As shown below is one embodiment of a improvement of the conventional CNN according to FIG. 3:

The vehicle image is represented in the tensor mode and is input to the input module of the network directly to be specific:

Taking a MNIST (mixed national institute of standards and technology) handwritten digital grayscale image as an example, a size is 28×28. For a convenience of subsequent steps, all samples are treated with 45° counterclockwise rotation noise. Therefore, in the embodiment a size of $Z^{(0)}$ is 28×28×1. And the $Z^{(l)}$ is a third-order tensor representing an output map of a lth layer, and is also an input map of the (l+1)th layer. The first order represents a height of $Z^{(l)}$, the second order represents a width of $Z^{(l)}$, and the third order represents a layer of $Z^{(l)}$.

The vehicle image enters the space transformation network for geometric space transformation correction. To be specific:

The input image $Z^{(0)}$ enters a positioning network module to learn a transformation matrix θ and output elements $\theta_{ij}$ of the transformation matrix θ. The positioning network is a small recurrent neural network, that is, the CNN or a fully connected network, which is not limited herein. A size of the transformation matrix θ depends on a size of an input. For example, the input is a two-dimensional matrix, the size of the transformation matrix θ is 2×3. and if the input is a three-dimensional matrix, the size of the transformation matrix θ is 3×4, and so on.

A coordinate of a coordinate system of the output image $Z^{(1)}$ is configured to be $(x^t, y^t)$ where "t" is ail abbreviation of target, representing a target image $Z^{(l)}$, i.e. the output image $Z^{(1)}$. The output image $Z^{(1)}$ is mapped to the coordinate $(x^s, y^s)$ on the coordinates system of the input image by the transformation matrix θ to generate a sampling grid. Wherein "s" is an abbreviation of source, which represents the source image $Z^{(0)}$ is the input image. The relationship between the target image and the source image is as follows:

$$\begin{pmatrix} x^s \\ y^s \end{pmatrix} = \begin{bmatrix} \theta_{11} & \theta_{12} & \theta_{13} \\ \theta_{21} & \theta_{22} & \theta_{23} \end{bmatrix} \begin{pmatrix} x^t \\ y^t \\ 1 \end{pmatrix}$$

Defining a type of a sampling kernel. The sampling kernel k() defined by the present disclosure determines an image interpolation type. For example, the image interpolation type determined by the sampling kernel k() defined in the embodiment is a bilinear interpolation function, and is not limited to the bilinear interpolation function. Pixels on the source image at the sampling grid $(x^s, y^s)$ are interpolated, and the pixel values obtained by the interpolation are transferred to the coordinate) $(x^t, y^t)$ on the output image $Z^{(1)}$ to obtain the output image $Z^{(1)}$.

$$V_i^c = \sum_{n=1}^{H} \sum_{m=1}^{W} U_{nm}^c \max(0, 1 - |x_i^s - m|)\max(0, 1 - |y_i^s - n|)$$

$$i = 1, 2, \ldots, W'H';$$

Wherein the i:=$(x_i^t, y_i^t)$ of $V_i^c$ is a coordinate value of an i-th element of the target image matrix $V^c$. Similarly, $x_i^s$ and $y_i^s$ are a coordinate value $(x^s, y^s)$ of the i-th element of the source image $U^c$. H and W respectively represent a height of the source image and a width of the source image, and W' and H' represent the height of the target image and the width of the target image respectively.

The input image $Z^{(0)}$ is renamed to be a corrected image $Z^{(1)}$ after outputting from the space transformation network. The corrected image enters a convolution module and a pooling module, and performs convolution processing and pooling processing respectively. To be specific:

In the embodiment, the feedforward convolution is an effective convolution operation with a step length of 1. The second and fifth layers are convolution layers. The Kernel$^{(l)}$ represents all convolution kernels of the lth layer. The first order represents the height of the convolution kernel, the second order represents the width of the convolution kernel, the third order represents the layer, and the fourth order represents the number of convolution kernels. The third layer and the sixth layers in the embodiment represent the pooling layers. And the commonly used pooling types are the max pooling and mean pooling.

After a plurality of "geometric space transformation→convolution→pooling", the feature map $Z^{(6)}$ obtained ultimately is vectorized output into column vector. That is, the feature map $Z^{(6)}$ obtained ultimately is rearranged into a column vector. Specifically, in the embodiment, the feature map obtained ultimately is $Z^{(6)}$, and a size of the feature map is 4×4'3, so a size of the feature map after vectorization is 48×1.

Figure 4:
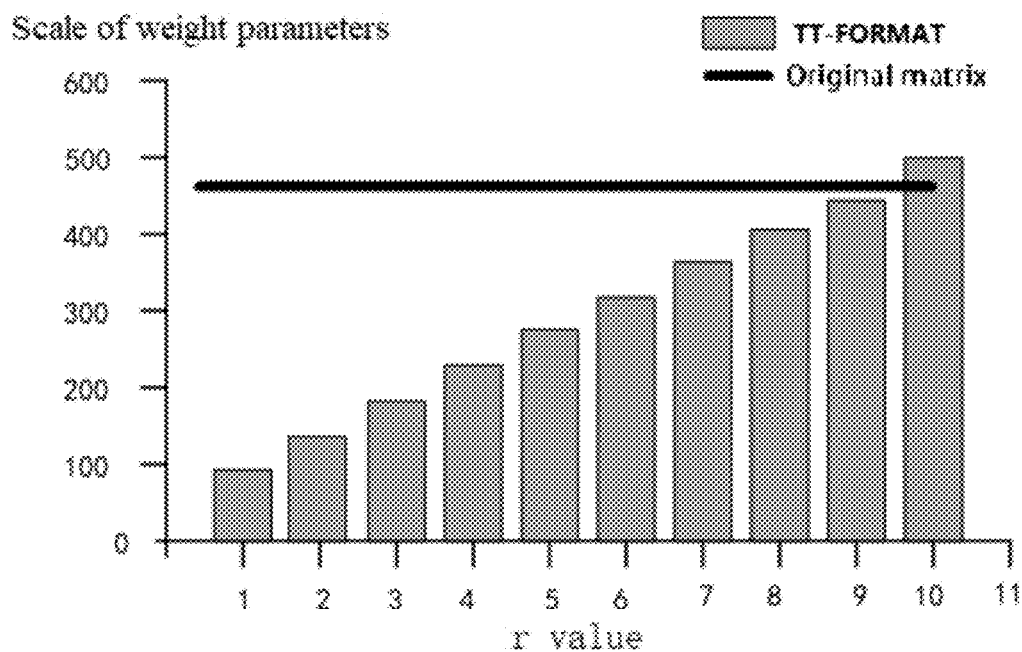
FIG. 4 is a schematic diagram showing a relationship between a weight parameter size and a r value in the embodiment of the present disclosure.

Then, the weight matrix of the fully connected layer perform the tensor column decomposition, and is represented as TT-format, and an operation mode of the fully connected layer is converted from the vector mode to the tensor mode. To be specific:

In the embodiment, a node size of the fully connected layer $Z^{(7)}$ is 48×1, and a node size of the output layer $Z^{(8)}$ is 10×1, so the size of the weight matrix of the fully connection layer is 10×48. A reconstruction scheme selected in the embodiment is 2×5 and 6×8. A TT-rank is set to be (1, r, 1), and the weight matrix is mapped to a matrix (a second order tensor) of (2×6)×(5×8). In the. tensor column decomposition processing, the TT-format of the weight matrix is obtained. Different r values correspond to the TT-format of different sizes. As shown in FIG. 4, the size of the original weight matrix is 10×48=480. When the TT-format is changed, as size of a weight parameter is proportional to the value of r, the appropriate r value reduces the size of the network parameter.

Mapping an input of the fully connected layer to a same order tensor of the high-order tensor to which the tensor column decomposition of the fully-connected layer weight matrix is mapped. In the weight matrix of the fully-connected layer of the embodiment, the matrix is mapped to a 12×40 matrix (second order tensor). and then tensor column decomposition is performed. The input of the fully connected layer is mapped to the matrix (second order tensor). Thus, the output of the fully connected layer is also the same order tensor (second order tensor). In this case, the output should he mapped to the vector output in order to be fully connected to the next fully connected layer or to make results of the output layer easy to interpret.

Then optimize all adjustable parameters in the network according to the BP algorithm. To be specific:

Defining a loss function as L. Commonly used loss functions are cross entropy loss function, square difference loss function, and so on. The letter L of present embodiment represents the loss function, and it should be understood that the loss function is not limit thereto and can be selected according to different situations.

First, to calculate the error $$\delta_k^{(8)} = \frac{\partial L}{\partial a_k^{(8)}} = y_k^{(8)} - z_k^{(8)}$$

of the output layer (the 8th layer in the present embodiment). The $\delta_k^{(8)}$, $\alpha_k^{(8)}$, $z_k^{(8)}$, $y_k^{(8)}$ represent an error of a kth node of the output layer, a net input, an output, an expected output respectively. The $$\frac{\partial L}{\partial a_k^{(8)}}$$

represents the loss function L is the $\alpha_k^{(8)}$ partial derivative.

In the present embodimentt, the output layer is also the fully connected layer. Therefore, the error vector of the output layer is mapped back to the same order tensor, and the error is passed back to the next layer through the fully-connected matrix represented by TT-format. Because the error vector of the output layer passes the fully connected weight value represented by TT-format, the error left is in the mode of the same order tensor, so it is necessary to map back to the vector mode to obtain the error vector of the stacked layer, namely:

$$\delta^{(7)} = \text{vec}(\mathcal{G}_1^{(8)} \mathcal{G}_2^{(8)})^T \text{tensor}(\delta^{(8)})) \circ f'(a^{(7)})$$

Tensor(x) represents mapping vector x to the same order tensor, $\mathcal{G}_1^{(l)} \mathcal{G}_2^{(l)} \ldots \mathcal{G}_d^{(l)}$ represents the fully connected weight represented by TT-format.

Since the fully connected weight matrix is mapped to the second order tensor (matrix) and is tensor column decomposed in the embodiment, thus, the fully connected weight represent by the TT-format of the 8th layer is $\mathcal{G}_1^{(8)} \mathcal{G}_2^{(8)}$. Vec(X) represents mapping the high-order tensor X to the vector, and "∘" represents point-wise multiplication. The f'(x) represents the function f(x)'s derivative function to x. Therefore, the fully connected weight represented by TT-format is updated to:

$$\mathcal{G}^{(8)new} = \mathcal{G}^{(8)} + \Delta\mathcal{G}^{(8)}, \Delta\mathcal{G}^{(8)} = -\eta \frac{\partial L}{\partial \mathcal{G}^{(8)}} = -\eta\delta^{(8)}(a^{(7)})^T$$

$$b^{(8)new} = b^{(8)} + \Delta b^{(8)}, \Delta b^{(8)} = -\eta \frac{\partial L}{\partial a^{(8)}} = -\eta\delta^{(8)},$$

Where the η represents a learning rate, which is generally 0.001. $\mathcal{G}^{(l)} = \mathcal{G}_1^{(l)} \mathcal{G}_2^{(l)} \ldots \mathcal{G}_d^{(l)}$ represents the lth layer of the frilly connected weight represented by the TT-format. The "T" means transpose, and the $b^{(l)}$ represents the offset parameter vector of the lth layer.

Mapping the error vector of the seventh layer, of which is a stacked layer, back to the graph mode, that is, the output of the sixth layer, of which is the pooling layer. Namely, $\delta^{(6)} = \text{ToMap}(\delta^{(7)})$, where ToMap(x) represents that the vector x is mapped back to the graph mode.

The error map of the sixth layer, which is the pooling layer, is passed to the fifth layer, which is the convolution layer, through upsampling on the pooling type. And the upsampling is a pooling inverse operation. If it is mean-pooling, an error of the pooling layer is averaged over its four inputs, and if it is max-pooling, the error is all propagated back to its four inputs. The pooling layer of the present embodiment is the max-polling layer. In this embodiment, the pooling type is not limited to the max-polling layer.

$$\delta^{(5)} = \text{upsample}(\delta^{(6)})$$

The convolution kernel weight parameter for the fifth layer, which is the convolutional layer, is updated to:

$$\Delta \text{Kernel}_{(:,:,j,i)}^{(5)} = -\eta \sum_{j=1}^{numel(A^{(5)},3)} convn(rot_{90}(Z_{(:,:,i)}^{(4)}), \delta_{(:,:,j)}^{5}, 'valid'),$$

$i = 1, 2, \ldots numel(A^{(4)}, 3);$ $\Delta b_k^{(5)} = -\eta \text{sum}(\delta_{(:,:,k)}^{(5)}), k = 1, 2, \ldots numel(\text{Kernel}^{(5)}, 4)$:

$\text{Kernel}^{(5)new} = \text{Kernel}^{(5)} + \Delta \text{Kernel}^{(5)},$ $b^{(5)new} = b^{(5)} + \Delta b^{(5)};$ Where the $A^{(l)}$ represents the convolutional net input of the lth layer. The numel($A^{(l)}$,3) represents the number of layers of the lth layer of convolution net input. The $rot_{90}(X)$ represents to rotate elements of matrix X with 90 degrees clockwise. The $Z^{(l)}$ represents an output image of the lth layer and represents an input image of the (l+1)th layer. The first order and the second order represents the height and the width of the $Z^{(l)}$ respectively. The third order represents the layer of $Z^{(l)}$, 'valid' indicates that the convolution type is a valid convolution.

The error image of the fifth layer, which is the convolutional layer, is passed to the fourth layer, which is a space conversion layer by a full convolution operation:

$$\delta_{(:,:,i)}^{(4)} = \sum_{j=1}^{numel(A^{(5)},4)} convn(\delta_{(:,:,j)}^{(5)}, rot_{180}(\text{Kernel}_{(:,:,i,j)}^{(5)}), 'full')$$

Where the numel(Kernel$^{(l)}$, 4) represent that the lth layer is, a convolutional layer, the number of the convolution kernels. The convn represents a convolution operation. The rot180(X) represents that the elements of matrix X are rotated 180 degrees clockwise. And the 'full' represents that the convolution type is full convolution.

The fourth layer is the space transformation layer, and the parameters to be adjusted are the elements of the transformation matrix θ, to be specific:

$$\frac{\partial V_i^c}{\partial \theta} = \frac{\partial V_i^c}{\partial x_i^s} \frac{\partial x_i^s}{\partial \theta_x} = \sum_n^H \sum_m^W \max(0, 1-|y_i^s-n|)(x_i^t+y_i^t+1)\delta_{i(:,:,c)}^{(4)},$$

$$\frac{\partial V_i^c}{\partial \theta_y} = \frac{\partial V_i^c}{\partial y_i^s} \frac{\partial x_i^s}{\partial \theta_y} = \sum_n^H \sum_m^W \max(0, 1,-|x_i^s-m|)(x_i^t+y_i^t+1)\delta_{i(:,:,c)}^{(4)}$$

Where the $\theta_x$, $\theta_y$ correspond to the first row element and the second row element of the transformation matrix θ. The parameters in the positioning network can be updated according to the BP algorithm, which not be described here.

The above is an example of introducing a space transformation network and tensor decomposition in the conventional CNN, which can be applied to the license plate searching CNN and the recognition CNN.

205. determining whether there is the vehicle;

To search whether there is the vehicle, if there is the vehicle, step 207 is performed, and if not, the step 206 is performed.

206. determining whether the current static image is traversed;

If the vehicle does not exist in the current vehicle image, it is judged whether the current static image is traversed. If yes, step 201 is performed, and if no, step 202 is performed.

207. acquiring a license plate image;

If the vehicle exists after the vehicle image is searched from the vehicle searching CNN, the vehicle license plate image is obtained in the vehicle image. To be specific, the license plate image is acquired by traversing from an upper left corner to a lower right corner of the vehicle image in the specific step length.

208. preprocessing the license plate image;

The license plate image is preprocessed to obtain the preprocessed license plate image. The preprocessing is selected from the smooth processing, the denoising processing, the illumination normalization processing, the enhancement processing, and so on. And different preprocessings are selected according to specific needs, where no limitation is made herein.

209. searching whether there is a license plate corresponding to the license plate image from a license plate searching CNN;

The preprocessed license plate image is input to the license plate searching CNN to search whether there is the license plate corresponding to the license plate image. The CNN in the embodiment is the CNN that includes the space transformation network and the tensor decomposition, which improves the conventional CNN in the perspective of classification accuracy and network size. To be specific, first, multiple geometric space transformation correction, convolution processing, and pooling processing are applied on the license plate image by the space transformation network and the CNN. That is, the license plate image is firstly processes by geometric space transformation correction, then processed by convolution processing, then processed by pooling processing, and then processed by the geometric space transformation correction again, and loop over and over for multiple times. And a second feature map is obtained. Then, the column vector is output by vectoring the second feature map and a plurality of fully connected layers are connected to obtain the weight matrix of the frilly connected layers. Further, the tensor column decomposition is performed on the weight matrix of the fully connected layer to extract a second feature vector. Finally, the second feature vector is input to an output layer of the CNN to classify and predict, and to optimize adjustable parameters to search whether there is the license plate corresponding to the license plate image. The step of optimizing the adjustable parameters is to optimize all the adjustable parameters in the network according to the back-propagation (BP) algorithm. That is, the update of the space transformation matrix, the weight and the offset is according to the local gradient calculation of the error returned from the latter layer.

210. determining if there is the license plate corresponding to the license plate image;

To search whether there is the license plate corresponding to the license plate image, if yes, step 213 is performed, if not, step 211 is performed.

211. determining whether the current static image is traversed;

If the vehicle does not exist in the current license plate image, then it is judged whether the current static image is traversed. If yes, step 207 is performed, and if no, step 212 is performed.

212. searching in a next vehicle image:

To search in the next vehicle image to judge whether there is the license plate.

213. inputting the license plate image to a tensor neural network to detect;

If there is the license plate corresponding to the license plate image, the license plate image is input to the tensor neural network to detect. To be specific, the license plate image is input to the anomaly detection tensor neural network to detect whether the current license plate image is abnormal or not. If the current license plate image is abnormal, the current license plate image is discard and an abnormal warning message output and to detect the next license plate image, if the current license plate image is normal, the current license plate image enters the license plate recognition step.

In the embodiment, the anomaly detection is based on the tensor network and a probability density ratio anomaly detection. The specific training process is as follows:

A prerequisite is: supposed that there is a sample set $\{X_m\}_{m=1}^{M}$ with a small number of anomaly.

First, the sample set $\{X_m\}_{m=1}^{M}$ is divided into a standard {} and a review {}. A size of the standard {} is same as a size of the review {]. The standard {} includes all samples in the sample set as normal samples, and the review; includes all abnormal samples and sonic normal samples copied from the standard {}. To be specific, assuming that the sample set contains 15 normal samples and 3 abnormal samples, that is, there are 3 abnormal samples in 18 samples, there are standard {15}, review {(3)+12}, where 12 samples in review {} is the 12 samples randomly sampled from 15 samples in standard {}.

Then, to randomly match the samples in standard {} and review {} one-to-one to get the data pair {standard$_m$, review$_m\}_{m=1}^{M'}$. Each data pair is input to the training mapping function f(x) of the tensor neural network in the order of "standard, review". the output is the direct probability density ratio corresponding to the input x. After completing the training of the tensor neural network, the samples in the abnormal set review {} are input into the trained tensor neural network to obtain a corresponding direct probability density ratio p. And the ratio p of the anomaly in the sample set is combined to obtain a critical value of a critical direct probability density ratio $P_{critical}$.

The new sample is directly input into the trained tensor neural network to obtain its corresponding direct probability density ratio $p_{new}$. If $p_{new} \geq p_{critical}$, it is judged to be a normal sample, if not, it is regarded as an abnormal sample.

214. determining the license plate image is abnormal or not;

The license plate image is determined to be abnormal or not. If the license plate image is abnormal, step 215 is performed and an abnormal message is output directly. If not, the step 216 is performed.

215. outputting a abnormal message;

216. acquiring a recognition image;

If the license plate image is normal, the recognition image of the license plate image is acquired on the license plate image. To be specific, the recognition image is acquired by traversing from an upper left corner to a lower right corner of the license plate image in a specific step length.

217. inputting the recognition image to a determining neural network to judge;

The recognition image is input to the determining neural network to judge the area number, letters and numbers in the recognition image. And the area number image corresponding to the area number, the letter image corresponding to the letters, and the number image corresponding to the number are output. To be specific, the recognition image is preprocessed to obtain the preprocessed recognition image. The preprocessed recognition image is judged by the simple determining neural network. The output of the determining neural network includes four category: the area number, letters, numbers and others. If the judge result is others, the current recognition image is discarded, and the next recognition image is judged. If the judgment result is the area number, the recognition image enters the license plate recognition stage to recognize the area number. If the judgment result is letters, the recognition image enter's the license plate recognition stage to recognize the letters. If the judgment result is numbers, the recognition image enters the license plate recognition stage to recognize the numbers.

218. discarding the recognition image:

If the judge result is others, the current recognition image is discarded.

219. preprocessing an area number image:

If the recognition result is the area number, the area number image is preprocessed to obtain a preprocessed area number image.

220. recognizing by au area number recognition CNN;

The preprocessed area number image enters the area number recognition CNN to recognize the area number.

221. preprocessing a letter image;

If the recognition result is letters, the letter image is preprocessed to obtain a preprocessed letter image.

222. recognizing by a letter recognition CNN;

The preprocessed letter image enters the letter recognition CNN to recognize the letters.

223. preprocessing a number image;

If the recognition result is numbers, the number image is preprocessed to obtain a preprocessed number image.

224. recognizing by a number recognition CNN;

The preprocessed number image enters the number recognition CNN to recognize the numbers.

225. outputting a recognition result;

The license plate number recognition result in the form of "area number letter number" is output according to the three CNNs ultimately.

In the method of the second embodiment, after the tensor decomposition is introduced into the fully connected layer in the CNN, the network is renamed as the tensor neural network. And the feedforward transfer, error back propagation, and storage update of the weight of the fully connected layer change. Base on these, in the embodiment, the spacial conversion network is further introduced into the tensor neural network. To be specific, the space conversion module is embedded before each convolution layer to perform effective geometric space transformation correction on the convolution input, which effectively alleviates a limitation that the convolution layer does not have spatial invariance on the large transformation of the input image or the feature map, and improves the invariance of the convolution output space. Further, makes the extracted features more representative and improves the classification accuracy of the output layer. Furthermore, the operation of the fully connected layer is performed in a tensor mode, which effectively alleviates a limitation of a loss of spatial information caused by the fully connection. Moreover, the license plate recognition system uses multiple CNNs, multi-stage strategy to realize license plate recognition, and decomposes the complex process of license plate recognition into multiple simple sub-processes. Namely, decomposes into vehicle detection, license plate detection, license plate number recognition. And the license plate number recognition includes the area number recognition, the letter recognition and the number recognition, which effectively improves the efficiency of license plate recognition. In addition, anomaly detection based on direct probability ratio and tensor neural network is added before license plate recognition, and abnormal data is effectively and accurately recognized, abnormal data is filtered, unnecessary operations are reduced, and system efficiency is improved.

Embodiment 3

Figure 5:
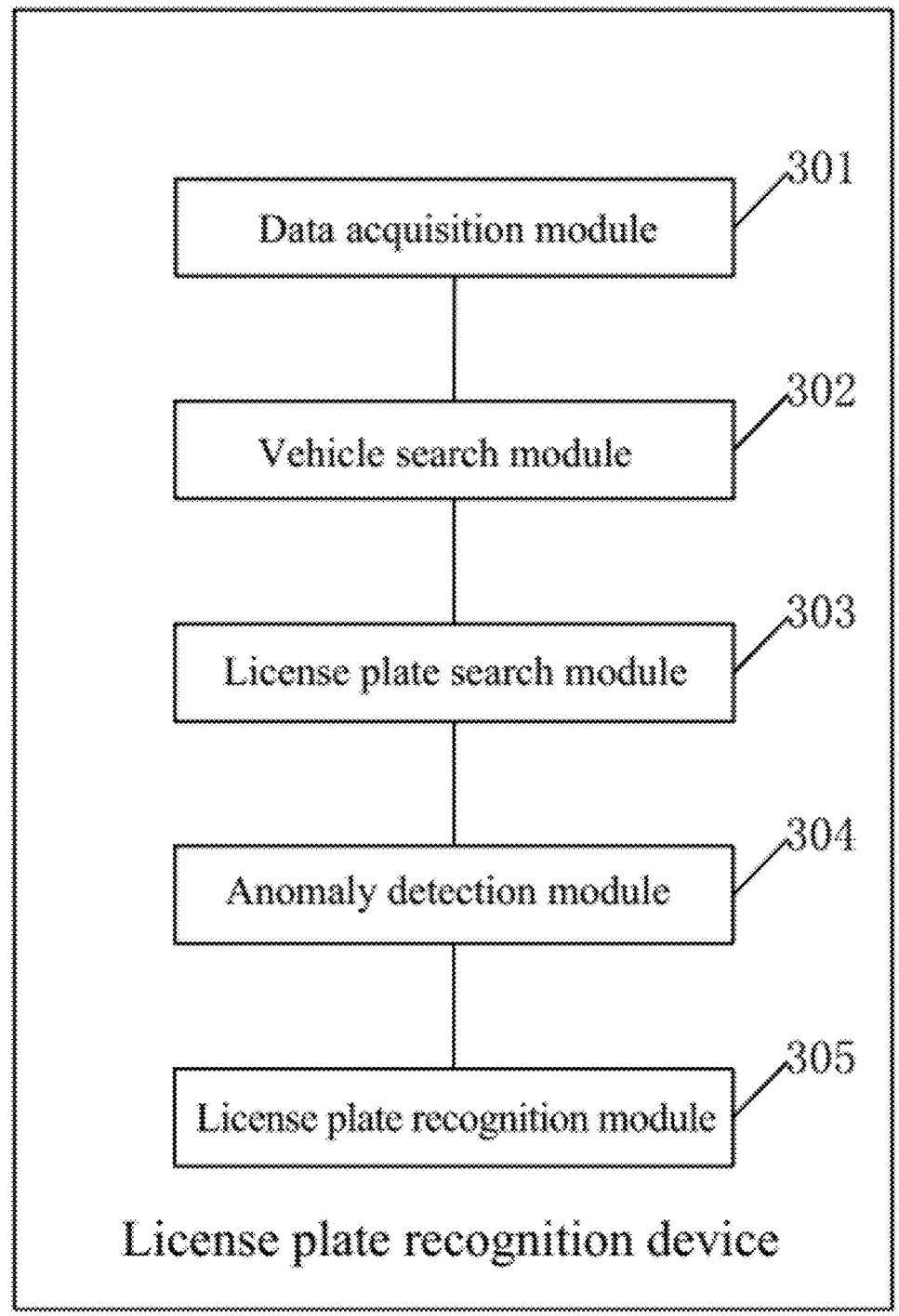
FIG. 5 is a schematic diagram of a structure of a license plate recognition device according to one embodiment of the present disclosure.

As shown in FIG. 5, FIG. 5 is a schematic diagram of a structure of a license plate recognition device according to one embodiment of the present disclosure. The license plate recognition device includes:

a data acquisition module 301;

The data acquisition module 301 is configured to acquire a vehicle image in a vehicle video stream image. To be specific, a vehicle image is obtained by traversing from an upper left corner to a lower right corner of a video stream image in a specific step length from the video stream data. The data acquisition module 301 is configured to acquire a license plate image in the vehicle image. To be specific, a license plate image is acquired by traversing from an upper left corner to a lower right corner of the vehicle image in a specific step length. And the data acquisition module 301 is configured to acquire a recognition image in the license plate image; To be specific, the recognition image is acquired by traversing from an upper left corner to a lower right corner of the license plate image in a specific step length.

a vehicle search module 302;

The vehicle search module 302 is configured to input the vehicle image obtained by the data acquisition module 301 to a vehicle searching CNN to search whether there is a vehicle corresponding to the vehicle image; To be specific, firstly; multiple geometric space transformation correction, convolution processing, and pooling processing are applied on the vehicle image by a space conversion network and the CNN. That is, the vehicle image is firstly processes by geometric space transformation correction, then processed by convolution processing, then processed by pooling processing, and then processed by the geometric space transformation correction again, and loop over and over for multiple times. And a first feature map is obtained. Then, a column vector is output by vectoring the first feature map and a plurality of fully connected layers are connected to obtain a weight matrix of the fully connected layers. Further, a tensor column decomposition is performed on the weight matrix of the fully connected layer to extract a first feature vector. Finally, the first feature vector is input to an output layer of the CNN to classify and predict, and optimizing adjustable parameters to search whether there is a vehicle corresponding to the vehicle image. The step of optimizing the adjustable parameters is to optimize all the adjustable parameters in the network according to a BP algorithm. That is, an update of a space transformation matrix, a weight and an offset is according to a local gradient calculation of an error returned from a latter layer.

a license plate search module 303;

The license plate search module 303 is configured to input the license plate image acquired by the data acquisition module 301 to the license plate searching CNN to search whether there is a license plate corresponding to the license plate image. To be specific, firstly, multiple geometric space transformation correction, convolution processing, and pooling processing are applied on the license plate image by the space conversion network and the CNN. That is, the license plate image is firstly processes by geometric space transformation correction, then processed by convolution processing, then processed by pooling processing, and then processed by the geometric space transformation correction again, and loop over and over for multiple times. And a second feature map is obtained. Then, the column vector is output by vectoring the second feature map and a plurality of fully connected layers are connected to obtain the weight matrix of the fully connected layers. Further, the tensor column decomposition is performed on the weight matrix of the fully connected layer to extract a second feature vector. Finally, the second feature vector is input to an output layer of the CNN to classify and predict, and optimizing adjustable parameters to search whether there is a license plate corresponding to the license plate image. The step of optimizing the adjustable parameters is to optimize all the adjustable parameters in the network according to the BP algorithm. That is, the update of the space transformation matrix, the weight and the offset is according to the local gradient calculation of the error returned from the latter layer.

an anomaly detection module; and

The anomaly detection module is configured to input the license plate image to a tensor neural network to detect the license plate image is abnormal or not. To be specific, the license plate image is input to the trained tensor neural network directly to obtain a corresponding direct probability density ratio. And then the direct probability density ratio is compared with a critical direct probability density ratio obtained after completing a training of the tensor neural network. If the direct probability density ratio is greater than the critical directly probability density ratio, the license plate image is normal. If not, the license plate image is abnormal.

a license plate recognition module.

The license plate recognition module is configured to input the recognition image acquired by the data acquisition module 301 to a determining neural network to judge an area number, letters, and numbers in the recognition image, and output an area number image corresponding to the area number, a letter image corresponding to the letters, and a number image corresponding to the number. To be specific, the recognition image is acquired by traversing from an upper left corner to a lower right corner of the license plate image in a specific step length. Then the recognition image is input to the determining neural network to judge the area number, letters, and numbers in the recognition image. And the area number image corresponding to the area number, the letter image corresponding to the letters, and the number image corresponding to the number are output. To be specific, the recognition image is preprocessed to obtain a preprocessed recognition image. The preprocessed recognition image is judged by the simple determining neural network. The output of the determining neural network includes four category: the area number, letters, numbers, and others. If a judge result is others, the current recognition image is discarded, and the next recognition image is judged. If the judgment result is the area number, the recognition image enters the license plate recognition stage to recognize the area number. If the judgment result is letters, the recognition image enters the license plate recognition stage to recognize the letters. If the judgment result is numbers, the recognition image enters the license plate recognition stage to recognize the numbers. And then the area number image, the letter image, and the number image are input to an area number recognition CNN, a letter recognition CNN, a number recognition CNN respectively to recognize an area number, letters, and numbers and outputting the area number, letters, and numbers respectively, and output a license plate number recognition result in a form of "area number letter number" according to the area number, letters, and numbers output.

The license plate recognition device described in FIG. 5, introducing the space transformation network and tensor decomposition in the convolutional neural network, improving the conventional convolution network on classification accuracy and network size, and recognizing the license plate by multi-stage identification of multiple CNNs, which has the accurate classification while the network is moderate in size and is able to be embedded in the mobile device.

Embodiment 4

Figure 6:
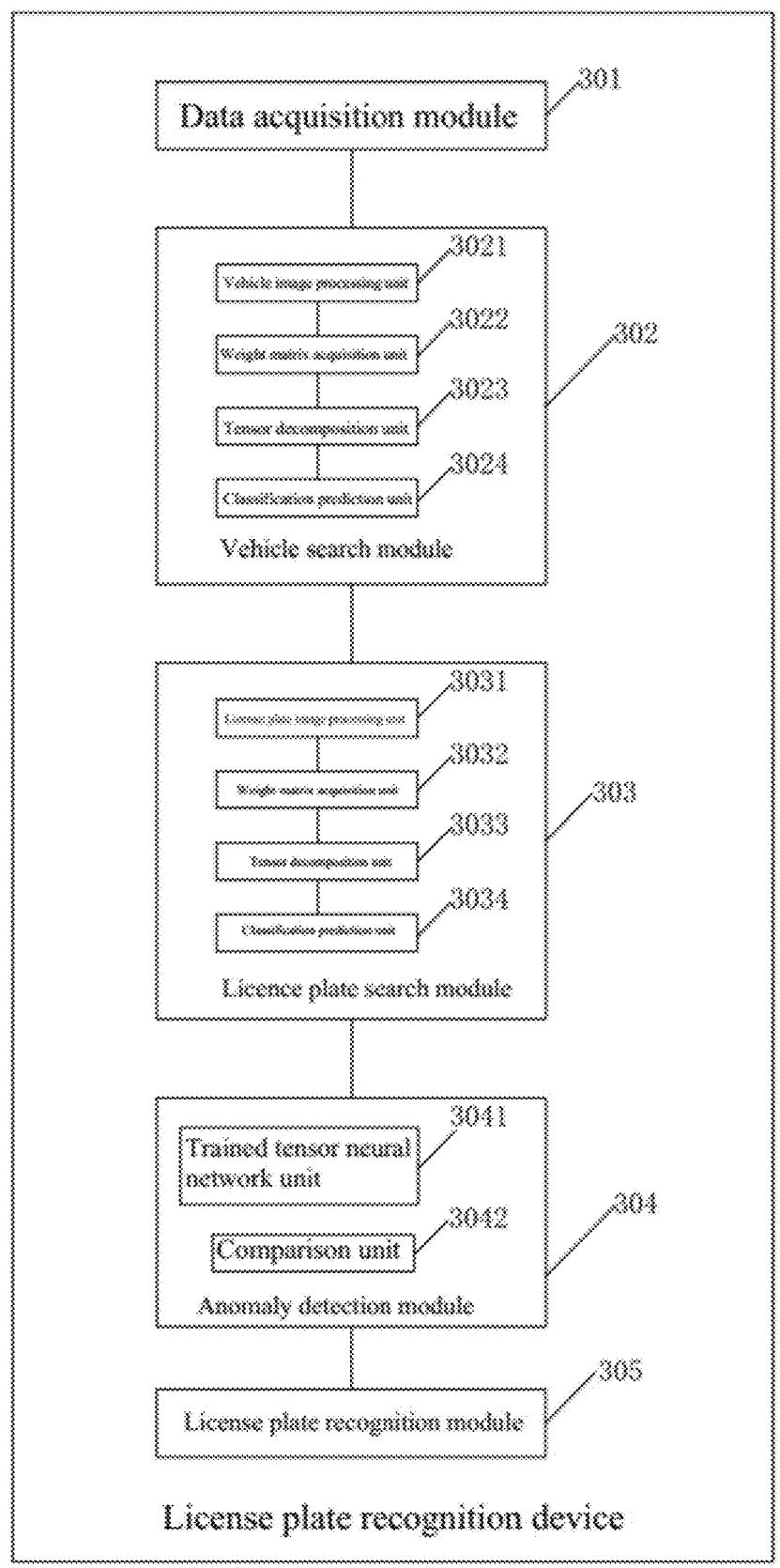
FIG. 6 is a schematic diagram of a structure of another license plate recognition device according to one embodiment of the present disclosure.

As shown in FIG. 6, FIG. 6 is a schematic diagram of a structure of another license plate recognition device according to one embodiment of the present disclosure. The license plate recognition device shown in FIG. 6 is obtained by optimizing the license plate recognition device shown in FIG. 5.

Furthermore, in the license plate recognition device shown in FIG. 6, the vehicle search module 302 includes:

a vehicle image processing unit 3021;

The vehicle image processing unit 3021 is configured to obtain a first feature map according to multiple geometric space transformation correction, convolution processing, and pooling processing in the vehicle image by a space transformation network and the CNN. To be specific, firstly, multiple geometric spatial transformation correction, convolution processing, and pooling processing are applied on the vehicle image by a space transformation network and the CNN. That is, the vehicle image is firstly processes by geometric space transformation correction, then processed by convolution processing, then processed by pooling processing, and then processed by the geometric space transformation correction again, and loop over and over for multiple times. And a first feature map is obtained.

a weight matrix acquisition unit 3022;

The weight matrix acquisition unit 3022 is configured to output a column vector by sectoring the first feature map and connecting a plurality of fully connected layers to obtain a weight matrix of the fully connected layers.

a tensor decomposition unit 3023; and

The tensor decomposition unit 3023 is configured to perform a tensor column decomposition on the weight matrix of the fully connected layer to extract a first feature vector.

a classification prediction unit 3024.

The classification prediction unit 3024 is configured to input the first feature vector to an output layer of the CNN to classify and predict, and optimizing adjustable parameters to search whether there is a vehicle corresponding to the vehicle image.

Furthermore, the license plate search module 303 includes:

a license plate image processing unit 3031;

The license plate image processing unit 3031 is configured to obtain a second feature map according to multiple geometric space transformation correction, convolution processing, and pooling processing on the license plate image by the space transformation network and the CNN. To be specific, firstly, multiple geometric spatial transformation correction, convolution processing, and pooling processing are applied on the license plate image by the space conversion network and the CNN. That is, the license plate image is firstly processes by geometric spatial transformation correction, then processed by convolution processing, then processed by pooling processing, and then processed by the geometric spatial transformation correction again, and loop over and over for multiple times. And a second feature map is obtained.

a weight matrix acquisition unit 3032;

The weight matrix acquisition unit 3032 is configured to output the column vector by vectoring the second feature map and connecting a plurality of fully connected layers to obtain the weight matrix of the fully connected layers.

a tensor decomposition unit 3033; and

The tensor decomposition unit 3033 is configured to perform the tensor column decomposition on the weight matrix of the fully connected layer to extract a second feature vector.

a classification prediction unit 3034.

The classification prediction unit 3034 is configured to input the second feature vector to the output layer of the CNN to classify and predict, and optimizing the adjustable parameters to search whether there is a license plate corresponding to the license plate image.

Furthermore, the anomaly detection module includes:

a trained tensor neural network unit 1; and

The trained tensor neural network unit 1 is configured to input the license plate image to the trained tensor neural network directly to obtain a corresponding direct probability density ratio.

a comparison unit 2.

The comparison unit 2 is configured to compare the direct probability density ratio with a critical direct probability density ratio obtained after completing a training of the tensor neural network. If the direct probability density ratio is greater than the critical directly probability density ratio, the license plate image is normal, if not, the license plate image is abnormal.

In the license plate recognition device shown in FIG. 6, after tensor decomposition is introduced into the fully connected layer in the CNN, the network is renamed as the tensor neural network. And the feedforward transfer, error back propagation, and storage update of the weight of the fully connected layer change. Base on these, in the embodiment, the spacial conversion network is further introduced into the tensor neural network. To be specific, the space conversion module is embedded before each convolution layer to perform effective geometric space transformation correction on the convolution input, which effectively alleviates a limitation that the convolution layer does not have spatial invariance on the large transformation of the input image or the feature map, and improves the invariance of the convolution output space. Further, makes the extracted features more representative and improves the classification accuracy of the output layer. Furthermore, the operation of the fully connected layer is performed in a tensor mode, which effectively alleviates a limitation of a loss of spatial information caused by the fully connection. Moreover, the license plate recognition system uses multiple CNNs, multi-stage strategy to realize license plate recognition, and decomposes the complex process of license plate recognition into multiple simple sub-processes. Namely, decomposes into vehicle detection, license plate detection, license plate number recognition. And the license plate number recognition further includes the area number recognition, the letter recognition and the number recognition, which effectively improves the efficiency of license plate recognition. In addition, anomaly detection based on direct probability density ratio and tensor neural network is added before license plate recognition, and abnormal data is effectively and accurately recognized, abnormal data is filtered, unnecessary operations are reduced, and system efficiency is improved.

Embodiment 5

Figure 7:
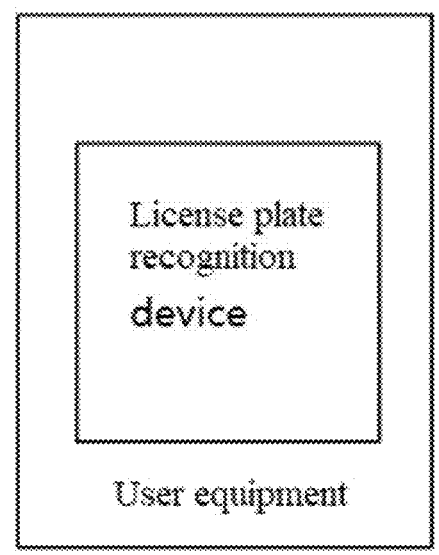
FIG. 7 is a schematic diagram of a structure of a user equipment according to one embodiment of the present disclosure.

As shown in FIG. 7, FIG. 7 is a schematic diagram of a structure of a user equipment according to one embodiment of the present disclosure. The user equipment shown in FIG. 7 includes any license plate recognition device of any of FIG. 5 to FIG. 6. The user equipment shown in FIG. 7 introduces the space transformation network and tensor decomposition in the CNN, improves the CNN on classification accuracy and network size, and recognizes the license plate by multi-stage identification of multiple CNNs, which has the accurate classification while the network is moderate in size and is able to be embedded in the mobile device.

One of ordinary skill in the art can understand that all or part of the various steps of the above embodiments can be completed by a program to instruct related hardware. The program can be stored in a computer readable storage medium. The storage medium includes ROM (read-only memory), RAM (random access memory), PROM (programmable read-only memory), EPROM (erasable programmable read only memory), OTPROM (one-time programmable read-only memory), EEPROM (electrically-erasable programmable read-only memory), CD-ROM (compact disc read-only memory), or other optical disc storage, disk storage, magnetic tape storage, or any other medium readable by a computer that can be used to carry or store data.

The vehicle license plate recognition method, device and user equipment disclosed in the embodiments of the present disclosure are described in detail above. The principles and implementations of the present disclosure are described herein with specific examples. It should be understood that the above description of the embodiments is only for better understanding the method of the present disclosure. In the meantime, those skilled in the art will be able to change the embodiments and the application scope according to the idea of the present disclosure. In summary, the content of the specification should not be construed as limitations of the present disclosure.

What is claimed is:

1. A license plate recognition method comprising following steps:
    acquiring a vehicle image and inputting the vehicle image to a vehicle searching convolutional neural network (CNN) to search whether there is a vehicle corresponding to the vehicle image:
    acquiring a license plate image on the vehicle image, and inputting the license plate image to a license plate searching CNN to search whether there is a license plate corresponding to the license plate image, if there is the vehicle image of the vehicle;
    inputting the license plate image to a tensor neural network to detect the license plate image is abnormal or not, if there is a license plate corresponding to the license plate image;
    acquiring a recognition image of the license plate image, and inputting the recognition image to a determining neural network to judge an area number, letters, and numbers in the recognition image, and outputting an area number image corresponding to the area number, a letter image corresponding to the letters, and a number image corresponding to the numbers, if the license plate image is normal;
    inputting the area number image, the letter image, the number image to an area number recognition CNN, a letter recognition CNN, a number recognition CNN respectively to recognize an area number, letters, and numbers and outputting the area number, letters, and numbers respectively; and
    outputting a license plate number recognition result in a form of "area number letter number" according to the area number, letters, and numbers output;
    wherein the step of acquiring the vehicle image and inputting the vehicle image to the vehicle searching CNN to search whether there is the vehicle corresponding to the vehicle image comprises steps:
    acquiring the vehicle image in a video stream data, the vehicle image being represented in a tensor mode;
    obtaining a first feature map according to multiple geometric space transformation correction, convolution processing, and pooling processing in the vehicle image by a space transformation network and the CNN;
    outputting a column vector by vectoring the first feature map and connecting a plurality of fully connected layers to obtain a weight matrix of the fully connected layers;
    performing a tensor column decomposition on the weight matrix of the fully connected layer to extract a first feature vector; and
    inputting the first feature vector to an output layer of the CNN to classify and predict, and optimizing adjustable parameters to search whether there is a vehicle corresponding to the vehicle image.

2. The license plate recognition method according to claim 1, wherein the step of inputting the license plate image to the license plate searching CNN to search whether there is the license plate corresponding to the license plate image comprises steps:
    obtaining a second feature map according to multiple geometric space transformation correction, convolution processing, and pooling processing on the license plate image by the space transformation network and the CNN;
    outputting the column vector by vectoring the second feature map and connecting a plurality of fully connected layers to obtain the weight matrix of the fully connected layers;
    performing the tensor column decomposition on the weight matrix of the folly connected layer to extract a second feature vector; and
    inputting the second feature vector to the output layer of the CNN to classify and predict, and optimizing the adjustable parameters to search whether there is the license plate corresponding to the license plate image.

3. The license plate recognition method according to claim 1, wherein the step of optimizing the adjustable parameters is to optimize all the adjustable parameters in the network according to a back-propagation (BP) algorithm, wherein an update of a space transformation matrix, a weight and an offset is according to a local gradient calculation of an error returned from a latter layer.

4. The license plate recognition method according to claim 3, wherein the step of inputting the license plate image to the tensor neural network to detect the license plate image is abnormal or not comprises steps:
    inputting the license plate image to the trained tensor neural network directly to obtain a corresponding direct probability density ratio; and
    comparing the direct probability density ratio with a critical direct probability density ratio obtained after completing a training of the tensor neural network, if the direct probability density ratio is greater than the critical directly probability density ratio, the license plate image is normal; if not, the license plate image is abnormal.

5. A license plate recognition device, comprising:
    a data acquisition module configured to acquire a vehicle image in a vehicle video stream image, acquire a license plate image in the vehicle image, and acquire a recognition image in the license plate image;
    a vehicle search module configured to input the vehicle image to a vehicle searching CNN to search whether there is a vehicle corresponding to the vehicle image;
    a license plate search module configured to input the license plate image to the license plate searching CNN to search whether there is a license plate corresponding to the license plate image;
    an anomaly detection module configured to input the license plate image to a tensor neural network to detect the license plate image is abnormal or not; and
    a license plate recognition module configured to input the recognition image to a determining neural network to judge an area number, letters, and numbers in the recognition image, and output an area number image corresponding to the area number, a letter image corresponding to the letters, and a number image corresponding to the numbers, and then input the area number image, the letter image, the number image to an area number recognition CNN, a letter recognition CNN, a number recognition CNN respectively to recognize an area number, letters, and numbers and outputting the area number, letters, and numbers respectively; and output a license plate number recognition result in a form of "area number letter number" according to the area number, letters, and numbers output;

wherein the vehicle search module comprises:

a vehicle image processing unit configured to obtain a first feature map according to multiple geometric space transformation correction, convolution processing, and pooling processing in the vehicle image by a space transformation network and the CNN;

a weight matrix acquisition unit configured to output a column vector by vectoring the first feature map and connecting a plurality of fully connected layers to obtain a weight matrix of the fully connected layers;

a tensor decomposition unit configured to perform a tensor column decomposition on the weight matrix of the fully connected layer to extract a first feature vector: and a classification prediction unit configured to input the first feature vector to an output layer of the CNN to classify and predict, and optimizing adjustable parameters to search whether there is the vehicle corresponding to the vehicle image.

6. The license plate recognition device according to claim 5, wherein the license plate search module comprises:

a license plate image processing unit configured to obtain a second feature map according to multiple geometric space transformation correction, convolution processing, and pooling processing on the license plate image by the space transformation network and the CNN;

the weight matrix acquisition unit configured to output the column vector by vectoring the second feature map and connecting a plurality of fully connected layers to obtain the weight matrix of the fully connected layers:

the tensor decomposition unit configured to perform the tensor column decomposition on the weight matrix of the fully connected layer to extract a second feature vector; and the classification prediction unit configured to input the second feature vector to the output layer of the CNN to classify and predict, and optimizing the adjustable parameters to search whether there is the license plate corresponding to the license plate image.

7. The license plate recognition device according to claim 6, wherein the anomaly detection module comprises:

a tensor neural network unit configured to obtain a corresponding direct probability density ratio according to the license plate image input: and a comparison unit configured to compare the direct probability density ratio with a critical direct probability density ratio obtained after completing a training of the tensor neural network; if the direct probability density ratio is greater than the critical directly probability density ratio, the license plate image is normal; if not, the license plate image is abnormal.

8. A user equipment, comprising a license plate recognition device; wherein the license plate recognition device comprises:

a data acquisition module configured to acquire a vehicle image in a vehicle video stream image, acquire a license plate image in the vehicle image, and acquire a recognition image in the license plate image;

a vehicle search module configured to input the vehicle image to a vehicle searching CNN to search whether there is a vehicle corresponding to the vehicle image:

a license plate search module configured to input the license plate image to the license plate searching CNN to search whether there is a license plate corresponding to the license plate image;

an anomaly detection module configured to input the license plate image to a tensor neural network to detect the license plate image is abnormal or not; and a license plate recognition module configured to input the recognition image to a determining neural network to judge an area number, letters, and numbers in the recognition image, and output an area number image corresponding to the area number, a letter image corresponding to the letters, and a number image corresponding to the number, and then input the area number image, the letter image, the number image to ail area number recognition CNN, a letter recognition CNN, a number recognition CNN respectively to recognize an area number, letters, and numbers and outputting the area number, letters, and numbers respectively: and output a license plate number recognition result in a form of "area number letter number" according to the area number, letters, and numbers output;

wherein the vehicle search module comprises:

a vehicle image processing unit configured to obtain a first feature map according to multiple geometric space transformation correction, convolution processing, and pooling processing in the vehicle image by a space transformation network and the CNN;

a weight matrix acquisition unit configured to output a column vector by vectoring the first feature map and connecting a plurality of fully connected layers to obtain a weight matrix of the folly connected layers;

a tensor decomposition unit configured to perform a tensor column decomposition on the weight matrix of the fully connected layer to extract a first feature vector; and a classification prediction unit configured to input the first feature vector to an output layer of the CNN to classify and predict, and optimizing adjustable parameters to search whether there is the vehicle corresponding to the vehicle image.

9. The user equipment according to claim 8, wherein the license plate search module comprises:

a license plate image processing unit configured to obtain a second feature map according to multiple geometric space transformation correction, convolution processing, and pooling processing on the license plate image by the space transformation network and the CNN;

the weight matrix acquisition unit configured to output the column vector by vectoring the second feature map and connecting a plurality of fully connected layers to obtain the weight matrix of the folly connected layers;

the tensor decomposition unit configured to perform the tensor column decomposition on the weight matrix of the folly connected layer to extract a second feature vector; and the classification prediction unit configured to input the second feature vector to the output layer of the CNN to classify and predict, and optimizing the adjustable parameters to search whether there is the license plate corresponding to the license plate image.

10. The user equipment according to claim 9, wherein the anomaly detection module comprises:

a tensor neural network unit configured to obtain a corresponding direct probability density ratio according to the license plate image input; and a comparison unit configured to compare the direct probability density ratio with a critical direct probability density ratio obtained after completing a training of the tensor neural network; if the direct probability density ratio is greater than the critical directly probability density ratio, the license plate image is normal; if not, the license plate image is abnormal.

\* \* \* \* \*